(12) United States Patent
Tones (10) Patent No.: US 6,834,859 B2
(45) Date of Patent: Dec. 28, 2004

(54) LABYRINTH GREASE HUB SEAL

(75) Inventor: Christopher E. Tones, Palmyra, NY (US)

(73) Assignee: Garlock Sealing Technologies LLC, Palmyra, NY (US)

( * ) Notice: Subject to any disclaimer, the term of this patent is extended or adjusted under 35 U.S.C. 154(b) by 0 days.

(21) Appl. No.: 10/355,570

(22) Filed: Jan. 31, 2003

(65) Prior Publication Data

US 2003/0141668 A1 Jul. 31, 2003

Related U.S. Application Data

(60) Provisional application No. 60/353,713, filed on Jan. 31, 2002.

(51) Int. Cl.$^7$ ............................................. F16J 15/447
(52) U.S. Cl. .................... 277/412; 277/415; 277/421; 384/480
(58) Field of Search ................. 277/412, 415, 277/418–420, 421; 384/480

(56) References Cited

U.S. PATENT DOCUMENTS

| | | | |
|---|---|---|---|
| 2,142,632 A | * 1/1939 | Cox ............................ 384/480 |
| 2,819,100 A | * 1/1958 | Peterson ..................... 277/421 |
| 2,917,328 A | * 12/1959 | Peterson ..................... 277/421 |
| 3,610,387 A | * 10/1971 | Vom Stein .................... 193/37 |
| 4,114,902 A | 9/1978 | Orlowski |
| 4,154,447 A | * 5/1979 | Francis et al. ............... 277/420 |
| 4,175,752 A | 11/1979 | Orlowski |
| 4,277,114 A | * 7/1981 | Lindegger ................... 384/144 |
| 4,304,409 A | 12/1981 | Orlowski |
| 4,373,759 A | * 2/1983 | Greener et al. ............. 384/480 |
| 4,452,497 A | * 6/1984 | Zillhardt ..................... 384/480 |
| 4,458,957 A | * 7/1984 | Greener ...................... 384/538 |
| 4,552,367 A | 11/1985 | Fedorovich et al. |
| 4,743,034 A | * 5/1988 | Kakabaker et al. ......... 277/420 |
| 4,763,904 A | * 8/1988 | Martinie ...................... 277/348 |
| 4,848,937 A | * 7/1989 | Hartman et al. ............. 384/480 |
| 4,978,236 A | * 12/1990 | Ostling ........................ 384/480 |
| 4,989,883 A | 2/1991 | Orlowski |
| 5,025,917 A | * 6/1991 | Smith et al. ................. 198/842 |
| 5,069,461 A | 12/1991 | Orlowski |
| 5,158,304 A | 10/1992 | Orlowski |
| 5,221,095 A | 6/1993 | Orlowski |
| 5,290,047 A | * 3/1994 | Duffee et al. ................ 277/419 |
| 5,316,317 A | 5/1994 | Fedorovich et al. |
| 5,378,000 A | 1/1995 | Orlowski |
| 5,522,601 A | 6/1996 | Murphy |
| 5,735,530 A | 4/1998 | Merkin et al. |
| 5,951,020 A | 9/1999 | Orlowski |
| 6,017,037 A | 1/2000 | Fedorovich |
| RE36,804 E | * 8/2000 | Kajihara et al. ............. 384/480 |
| 6,206,182 B1 | * 3/2001 | Wilson et al. ............... 198/842 |
| 6,419,233 B2 | * 7/2002 | Orlowski ..................... 277/411 |
| 6,471,211 B1 | 10/2002 | Garnett et al. |
| 6,471,215 B1 | * 10/2002 | Drago et al. ................. 277/412 |
| 6,474,653 B1 | 11/2002 | Hintenlang et al. |
| 6,485,022 B1 | * 11/2002 | Fedorovich ................. 277/303 |

* cited by examiner

Primary Examiner—Alison K. Pickard
(74) Attorney, Agent, or Firm—John M. Harrington; Kilpatrick Stockton LLP (57) ABSTRACT

The present invention provides a labyrinth sealing assembly for placement between a shaft and a bearing housing comprising an annular stator having a body portion, an axially inner engagement surface, an axially inner extending portion extending from a radially outer end of the stator, an axially inner extending member extending from a radially inner end of the stator, and a keeper lip extending radially outward from the axially inner extending surface of the radially inner end of the stator, and an annular rotor having an axially outer engagement surface having a plurality of wear ridges on a radially outer engagement surface, and a keeper notch arrangement on a radially inner surface comprising a recess. The keeper lip engages the keeper notch to provide a snap fit between the rotor and stator.

16 Claims, 8 Drawing Sheets

LABYRINTH GREASE HUB SEAL

CROSS REFERENCE TO RELATED APPLICATIONS

This application is a continuation-in-part and claims priority to U.S. Provisional Application No. 60/353,713, filed on Jan. 31, 2002, the disclosure of which is herein incorporated by reference.

FIELD OF THE INVENTION

The present invention relates to a labyrinth sealing device, and more particularly, to a labyrinth seal for retaining grease within the bearing cavity of a high speed hub assembly, such as aircraft landing gear.

BACKGROUND OF THE RELATED ART

The current bearing seal employed in most aircraft landing gear systems is commonly referred to as a contact lip seal. The lip of the seal is pressed against the bearing race and held in a static position relative to the wheel axle. When the hub begins to turn at a high rate of speed, the rubber lip starts to wear away as a result of friction and heat. Within a short period of time the lip no longer makes contact with the bearing race. Consequently, a gap develops between the seal lip and the bearing race which allows grease to evacuate from the bearing cavity and permits water and other contaminates to penetrate into the bearing cavity. Over time, these contaminates and the depletion of the grease can lead to a catastrophic bearing failure.

It would be beneficial, therefore, to provide a grease seal for use in high speed hub applications, such as aircraft landing gear assemblies, that overcomes the deficiencies of prior art lip seals

SUMMARY OF THE INVENTION

The present invention provides a labyrinth grease seal configured to fit on a hub to secure grease within the bearing and prevent outside contaminates from entering. The seal is reliable, with an extended useful life and has been designed to minimize wear and frictional heat build up which will damage the seal. This seal is particularly well suited for high speed hubs such as those in airplane landing gear. However, the seal is also suitable for use over a broad RPM range.

In a first aspect of the present invention, a labyrinth sealing assembly for placement between a shaft and a bearing housing is provided comprising an annular stator statically associated with an axle and having at least one rotor engagement surface, and an annular rotor associated with a hub, wherein the rotor comprises at least one wear ridge that is associated with the at least one rotor engagement surface of the stator and the rotor and stator engage so as to form a labyrinth path on the radially inward side of the sealing assembly.

In one embodiment of the present invention, a labyrinth sealing assembly for placement between a shaft and a bearing housing is provided comprising an annular stator having a body portion, an axially inner engagement surface, an axially inner extending portion extending from a radially outer end of the stator, an axially inner extending member extending from a radially inner end of the stator, and a keeper lip extending radially outward from the axially inner extending surface of the radially inner end of the stator, and an annular rotor having an axially outer engagement surface having a plurality of wear ridges on a radially outer engagement surface, and a keeper notch arrangement on a radially inner surface comprising a recess. The keeper lip engages the keeper notch to provide a snap fit between the rotor and stator.

In a second aspect of the present invention, a labyrinth sealing assembly for placement between a shaft and a bearing housing is provided comprising, an annular stator statically associated with an axle, and an annular rotor associated with a hub, wherein the rotor comprises at least one wear ridge that is associated with a rotor engagement surface on a bearing face, said rotor and said stator being configured to form a labyrinth pathway on the radially inward side of the sealing assembly.

In a further embodiment of the present invention, a labyrinth sealing assembly for placement between a hub rotor and a bearing housing is provided comprising, an annular stator comprising an axially inner surface with an axially inner extending member protruding therefrom, the axially inner extending member having a radially inner protrusion extending therefrom, and an annular rotor comprising a body portion having a radially inner extending member having a plurality of wear ridges extending radially inward therefrom, said body portion of the rotor also having a keeper lip extending radially inward therefrom. The keeper lip engages the radially outward protrusion of the stator to provide a snap fit between the rotor and the stator.

DETAILED DESCRIPTION OF THE INVENTION

Figure 1:
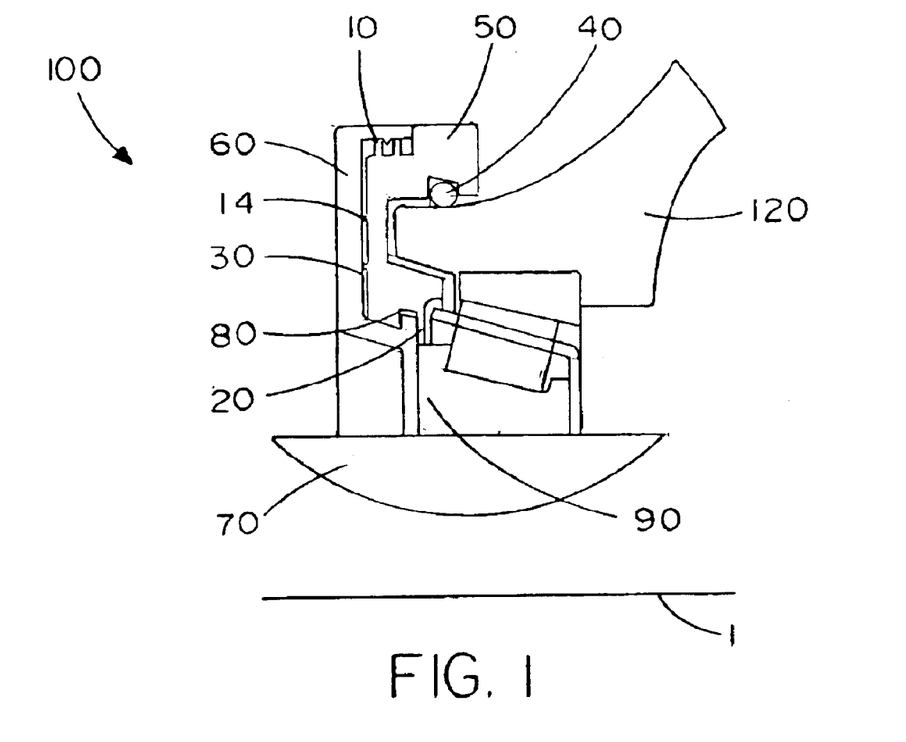
FIG. 1 illustrates the labyrinth grease hub seal of the present invention operatively associated with an exterior surface of a hub.
Figure 5:
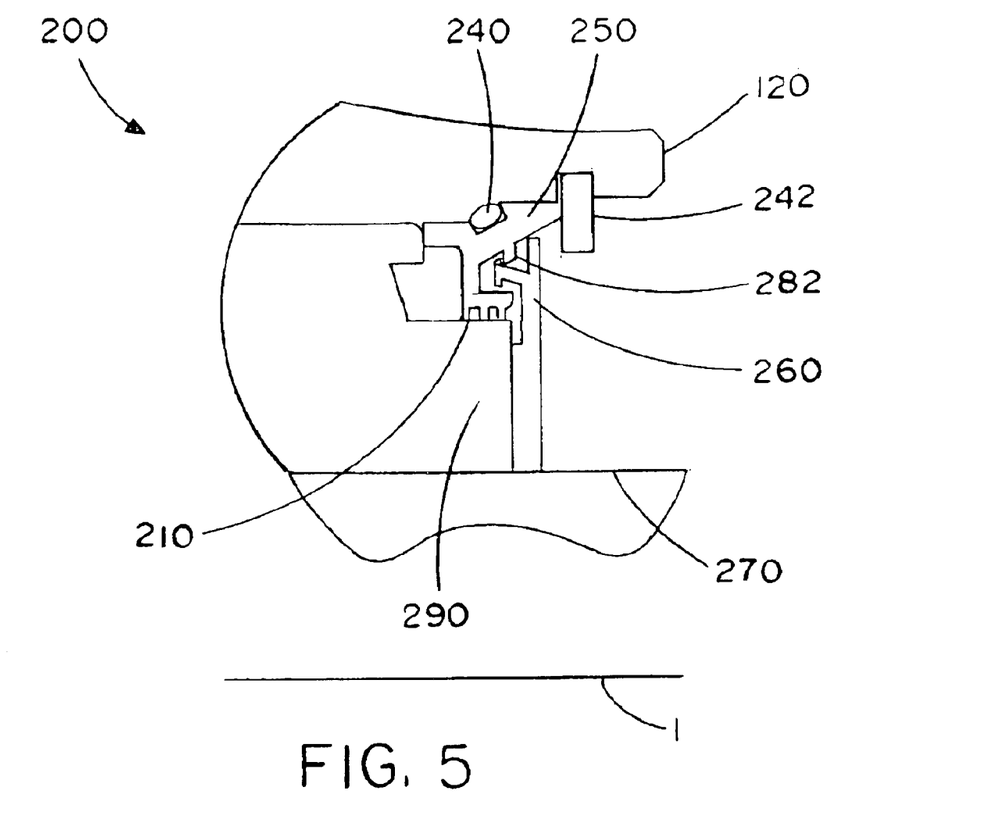
FIG. 5 illustrates the labyrinth grease hub seal of the present invention operatively associated with an interior surface of a hub.

Referring to the drawings in which like reference numerals identify similar structural elements of the disclosed device, there is illustrated in FIGS. 1 and 5 two embodiments of labyrinth sealing devices constructed in accordance with preferred embodiments of the present invention and designated generally by reference numerals 100 and 200 respectively. Both embodiments comprise annular rotors and stators to be employed in annular bearing cavities within hub. However, for the purposes of illustration and understanding only cross-sectional views have been provided in the figures. All figures have a center-line 1 marking the interior, or radically inner side of the seal. This line is provided merely as a reference to illustrate orientation and is not a component of the invention.

Labyrinth grease seal 100 is adapted and configured to fit on the exterior side of a hub, while labyrinth grease seal 200 is adapted and configured for installation on the interior side of a hub. The use of a particular configuration will depend on the amount of area available in a particular hub assembly. Both grease seals 100, 200 consist of two cooperative components including a stator 60, 260 and a rotor 50, 250. In an embodiment of the present invention, the stator 60, 260 preferably comprises a high strength non-corrosive material. In a further embodiment of the present invention, the stator 60, 260 more preferably comprises 304 stainless steel.

The rotor serves as the primary sealing component of the assembly. In one embodiment of the present invention, the rotor 50, 250 preferably comprises a filled polytetrafluoroethylene (PTFE). The filled PTFE material from which the rotor 50, 250 is made has been selected for its wear characteristics and for reducing heat build-up during operation. Other similar plastics based materials that meet the wear characteristics and heat dissipation requirements of the stators intended use are also suitable for use in the present invention.

Referring to FIGS. 1–4, in the exterior embodiment of the present invention, the rotor 50 comprises at least one wear ridge 10 on a radially outward engagement surface, and an axially outer engagement surface 54 which engage a rotor engagement surface 62 on the stator 60. In a further embodiment of the present invention, rotor 50 comprises a plurality of radial wear ridges 10 provided on the axially outer periphery thereof, a keeper notch 84 on a radially inner surface, and a radially inner grease skirt 20 for retaining grease within the bearing cavity.

The grease skirt 20 comprises one or more radially inward protrusions with a minimal radial clearance to the bearing 90 outer diameter. The grease skirt 20 is located below the path of the grease that is being thrown outward by centrifugal force during hub operation and therefore assists in preventing grease from migrating to the axially outer side of the rotor. The one or more radial inward protrusions should be as close as possible to the bearing outer diameter to minimize the ability of grease to pass through. Conversely, the grease skirt should not be forcibly touching the bearing 90 as this will cause excessive wear and frictional heat.

In the exterior embodiment of the present invention, the rotor 50 is secured to the hub 120 by a press fit fluoroelastomer O-ring 40. The O-ring 40 is fitted into an annular groove 58 along an axially inner extending and radially inner facing surface of the stator 50. The O-ring 40 acts as a locking mechanism with the hub, as well as a sealing mechanism to retain grease within the bearing cavity and exclude contaminates therefrom. The O-ring is preferably made from a fluoroelastomer such that it is compressible and will conform to the rotor 50 even in the event of slight radial movements of the rotor. This maintains the seal between the rotor 50 and the stator 60 during operation and prevents contaminate entry or grease leakage during normal operation.

Figure 2:
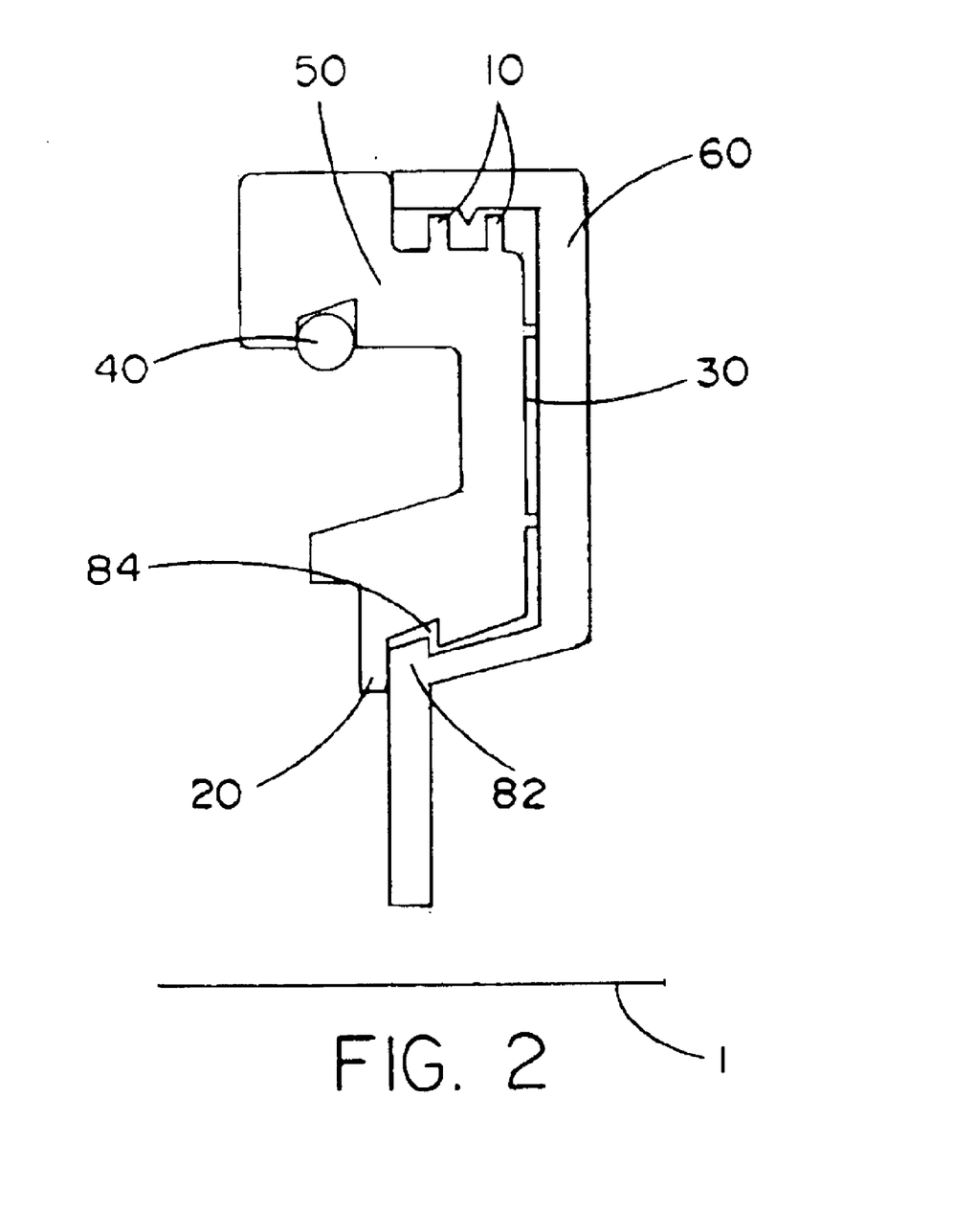
FIG. 2 is a cross-sectional view of the fully assembled labyrinth grease hub seal of FIG. 1.
Figure 4:
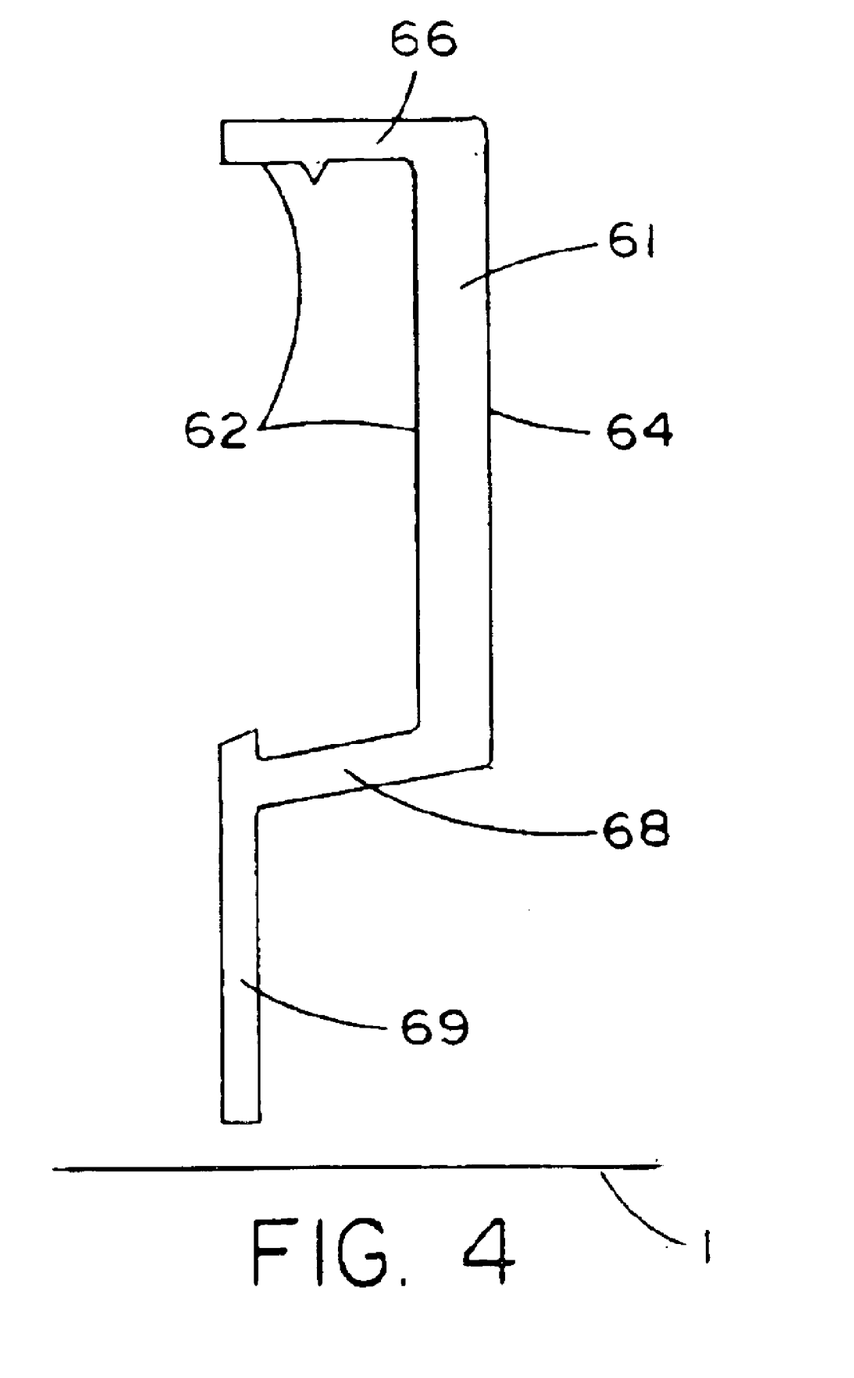
FIG. 4 is a cross-sectional view of the stator shown in FIG. 2

The stator 60 acts as a contamination shield and guide track for the rotor 50 to ride in during hub operation. The stator 60 has a body portion 61 with an axially inner engagement surface 62 and an axially outer surface 64. At the radially outer end of the body portion is an axially inner extending portion 66 which engages the wear ridges 10 of the stator. Furthermore, at the radially inner end of the body portion 61 is an axially inner extending member 68 with a radially inner extending member 69 extending therefrom.

Figure 3:
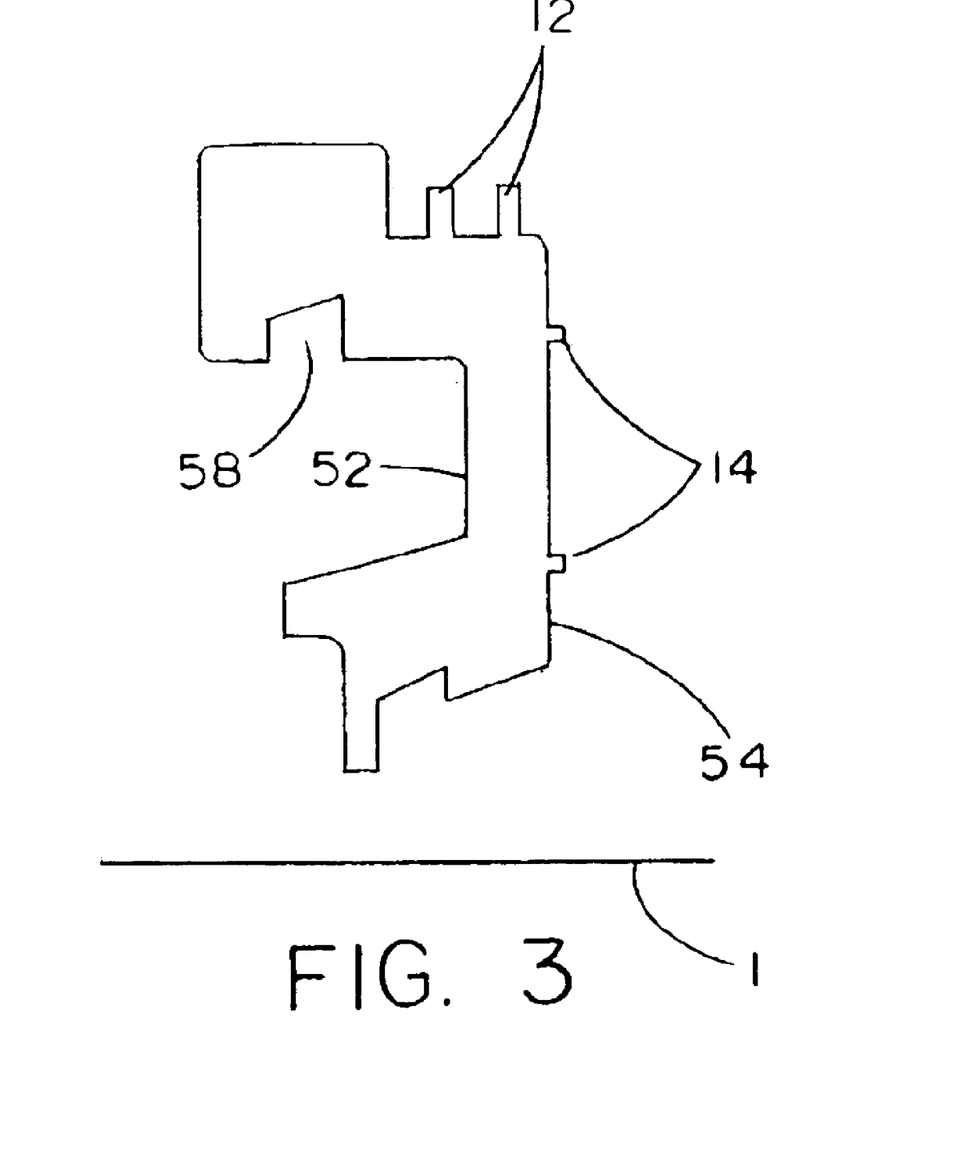
FIG. 3 is a cross-sectional view of the rotor shown in FIG. 2

During initial start up, friction can play a significant roll in the life of the seal. As the rotor 50 beings to spin, heat and friction cause the surface 30 of the rotor 50 to begin to wear.

In an embodiment of the present invention, wear ridges 10, 14 are provided along the axially outer surface 30 of the rotor 50 to reduce contact between the rotor 50 and the stator 60. There may be any number of radial ridges 10, 14 along the axially outer surface of the rotor; however, in a preferred embodiment of the present invention, there are two on the radial outer surface 12 and two along the axial outer 14 surface. The stator 60 is mounted to the wheel axle 70 and bearing face 90.

The rotor 50 and stator 60 are held together by means of a snap-fit connection defined by a keeper notch arrangement 80. The keeper notch arrangement 80 is defined by a keeper notch 84 in the radially inner surface of the rotor 50 and a corresponding keeper lip 82 protruding radially outward from the axially inner extending surface of the stator 60. As the rotor 50 is fitted into the stator 60, the keeper lip 82 slides into the keeper notch 84 and is held in place by the walls defining the notch 84. This structural connection also defines a labyrinth path that allows the egress of pressurized gasses from the bearing cavity caused by the heat generated in the bearings during high-speed operation. The labyrinth path allows pressure equalization and still retains the grease within the bearing cavity of the hub. After the initial heat build up, the bearings will cool down and a vacuum will be created within the bearing cavity. This vacuum encourages outside contaminates to be pulled into the bearing cavity. However, the radial inner grease skirt 20 and O-ring 40 prevent such contaminates from entering the cavity.

During use, the rotor 50, preferably made of a PTFE material, will wear as it contacts the stator 60. Since the rotor 50 is designed to wear during use, the stator 60 is protected from wear and thus preserves. Additionally, the design of the present invention preserves the rotor life as well through the minimal contact provided by the wear ridges. However, the seal still has a finite lifespan. After the seal has reached its cycle life, the rotor 50 can be removed and a new rotor 50 insert can be installed into the stator 60 and put back into surface. Due to the locking nature of the snapping keeper notch mechanism 80, the rotor 50 will be destroyed once it is removed from the stator 60. The rotor components 50, being relatively inexpensive compared to the stator 60, can be discarded and easily replaced. This provides a simple and economical way to wear and replace such components.

Referring to FIGS. 5–8, showing the interior embodiment of the present invention, the rotor 250 has a body portion 252 having a radially inner extending member 254 having at least one of wear ridge 210 extending radially inward therefrom. The at least one wear ridge 210 is provided on the rotor for contamination exclusion purposes, and to reduce frictional heat, as discussed previously. In a further embodiment of the present invention, a plurality of wear ridges 210 are provided. In another embodiment of the present invention, the at least one wear ridge is associated with a rotor engagement surface on the bearing 290. The body portion 252 of the rotor 250 also has a keeper lip 282 extending radially inward therefrom.

Figure 6:
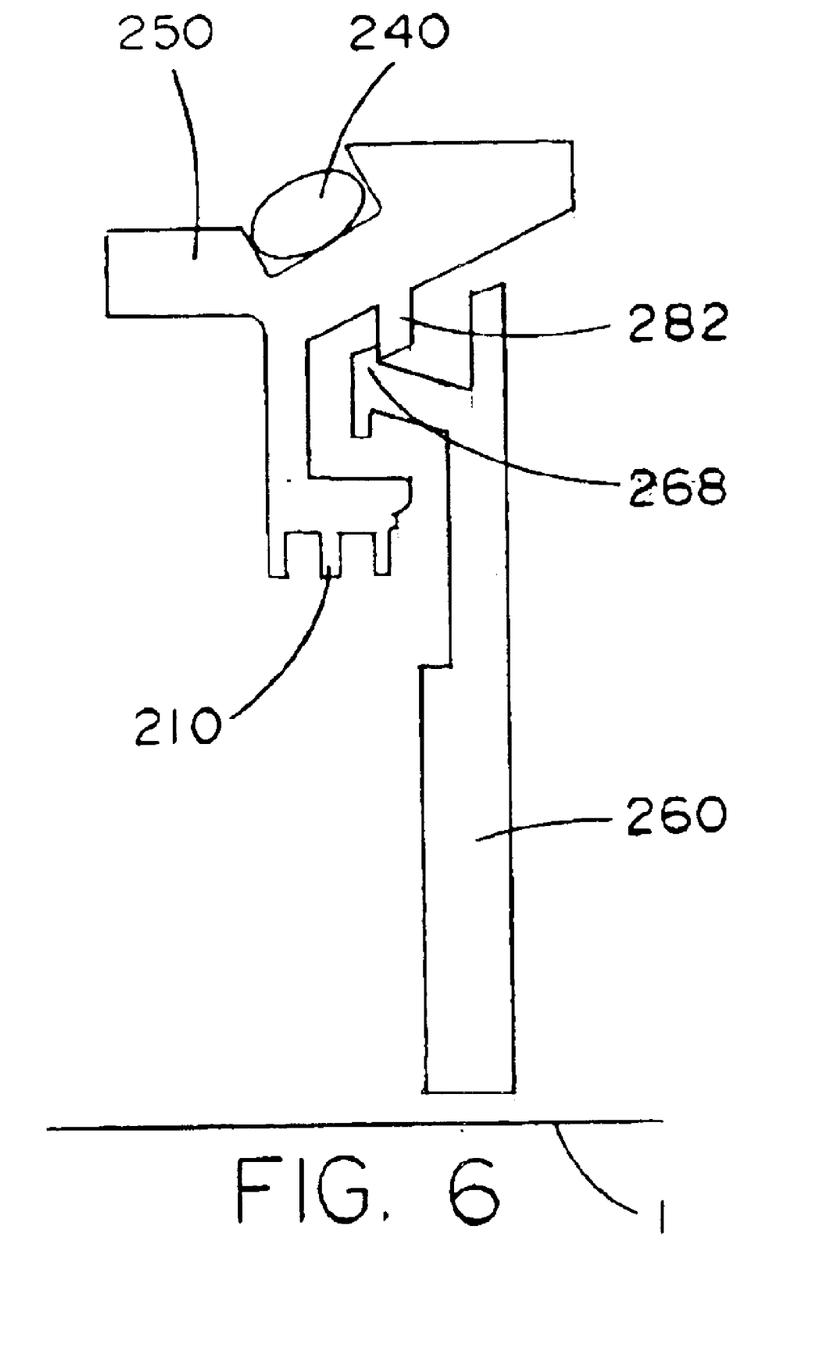
FIG. 6 is a cross-sectional view of the fully assembled labyrinth grease hub seal of FIG. 5.
Figure 8:
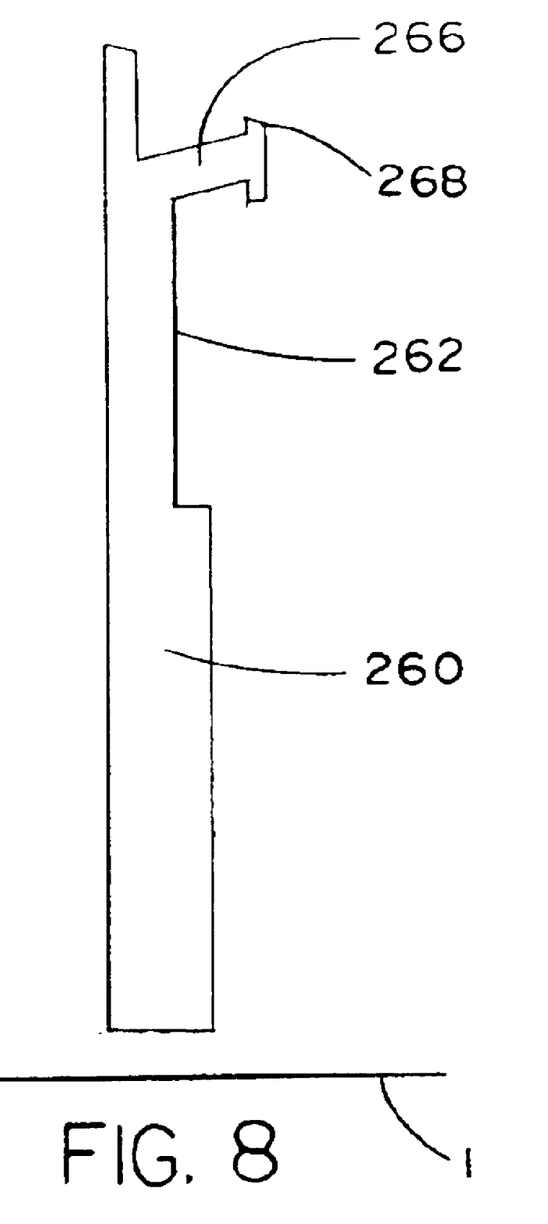
FIG. 8 is a cross-sectional view of the stator shown in FIG. 6.

The stator 260 comprises an axially inner surface 262 and an axially inner extending member 266 protruding therefrom. The axially inner extending member 266 has a radially outer extending protrusion 268 which engages the keeper lip 282 on the rotor 250 to secure the rotor 250 and stator 260 together in the event of movement in the axially inner direction.

Figure 7:
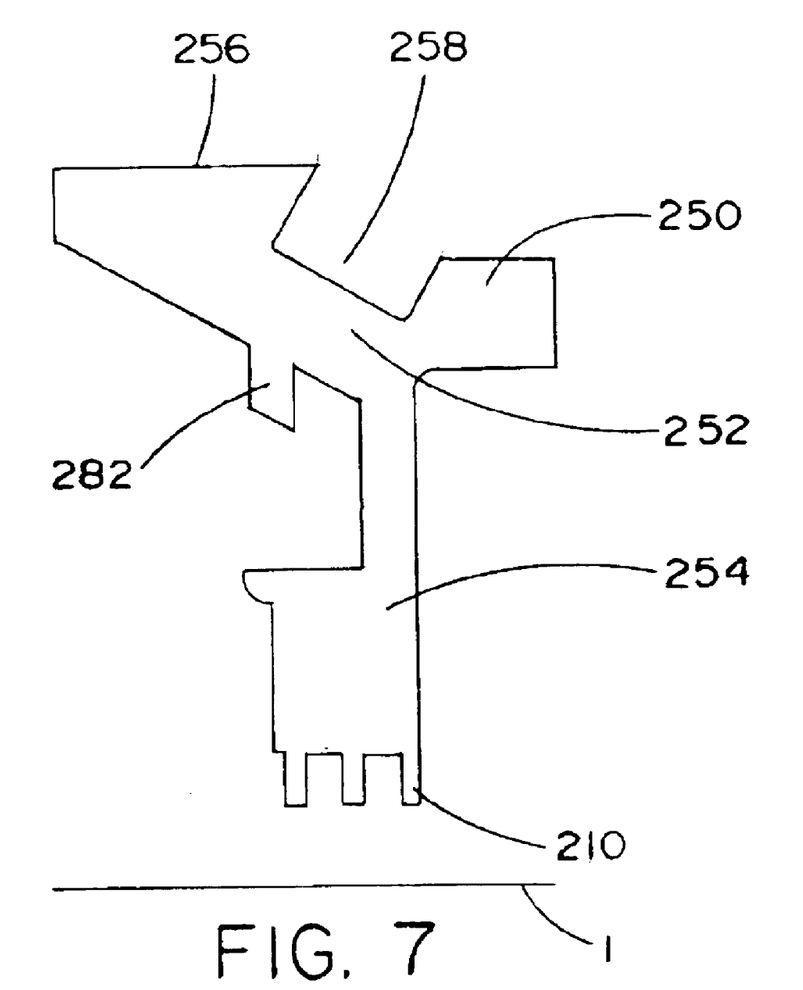
FIG. 7 is a cross-sectional view of the rotor shown in FIG. 6

Also provided is a fluoroelastomer O-ring 240. The O-ring 240 is housed in an annular groove 258 along the radially outer surface 256 of the rotor 250. In the interior embodiment of the present invention, the O-ring 240 acts only as a sealing mechanism to retain grease within the bearing cavity and exclude contaminates therefrom. The rotor 250 is secured to the hub 120 by an annular retaining ring 242. The annular retaining ring 242 engages the axially outer end of the rotor and is secured to the hub 120. The retaining ring 240 acts to lock the sealing assembly with the hub, by preventing axial movement, and secure the entire apparatus.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A labyrinth sealing assembly for placement between a stationary axle and a rotating hub comprising:
    an annular stator statically associated with an axle, comprising a body portion, an axially inner engagement surface, an axially inner extending portion extending from a radially outer end of the stator, an axially inner extending member extending from a radially inner end of the stator, and a keeper lip extending radially outward from the axially inner extending surface of the radially inner end of the stator; and
    an annular rotor associated with a hub, comprising an axially outer engagement surface having a plurality of wear ridges on a radially outer engagement surface, and a keeper notch arrangement on a radially inner surface comprising a recess;
wherein the keeper lip of the stator engages the keeper notch of the rotor to provide a snap fit between the rotor and stator, and the rotor and stator engage so as to form a labyrinth path on the radially inward side of the sealing assembly.

2. The sealing assembly of claim 1, wherein the stator comprises stainless steel.

3. The sealing assembly of claim 1, wherein the rotor comprises a plastics based material.

4. The sealing assembly of claim 1, wherein the rotor comprises filled PTFE.

5. The sealing assembly of claim 1, further comprising wear ridges on a axially outer extending surface of the rotor.

6. The sealing assembly of claim 1, further comprising an annular groove on a radially inner facing surface of the rotor.

7. The sealing assembly of claim 6, further comprising an O-ring fitted within the annular groove on the radially inner facing surface of the rotor.

8. The sealing assembly of claim 1, further comprising a skirt having one or more radially inward protrusions with a minimal radial clearance to the bearing outer diameter, wherein the skirt functions to prevent grease from migrating to the axially outer side of the rotor.

9. A labyrinth sealing assembly for placement between a rotating member and a stationary member comprising:
    an annular stator, comprising an axially inner surface with an axially inner extending member protruding therefrom, the axially inner extending member having a radially outer protrusion extending therefrom; and
    an annular rotor, comprising a body portion comprising a radially inner extending member and a plurality of wear ridges extending radially inward therefrom, said body portion of the rotor also comprising a keeper lip extending radially inward therefrom, wherein said keeper lip engages the radially outward protrusion of the stator to provide a snap fit between the rotor and the stator,
wherein the plurality of wear ridges are associated with a rotor engagement surface on a bearing face, said rotor and said stator being configured to form a labyrinth pathway on the radially inward side of the sealing assembly.

10. The sealing assembly of claim 9, wherein the stator comprises stainless steel.

11. The sealing assembly of claim 9, wherein the rotor comprises a plastics based material.

12. The sealing assembly of claim 9, wherein the rotor comprises filled PTFE.

13. The sealing assembly of claim 8, further comprising an annular groove in the radially outer surface of the rotor.

14. The sealing assembly of claim 13, further comprising an O-ring fitted within the annular groove on the radially outer facing surface of the rotor.

15. The sealing assembly of claim 9, further comprising an annular retaining ring engaging an axially outer end of the rotor and securedly engaged to a hub to hold the rotor in place.

16. A labyrinth sealing assembly for placement between a rotating member and a stationary member comprising:
    an annular stator, comprising a body portion comprising an axially inner engagement surface; an axially inner extending portion extending from a radially outer end of the body portion; an axially inner extending portion extending from a radially inner end of the body portion; and a keeper lip extending radially outward from the axially inner extending surface of the radially inner end of the stator; and
    an annular rotor, comprising a keeper notch positioned on a radially inner surface thereof, comprising a recess in the radially inner surface; wherein the keeper lip of the stator and the keeper notch of the rotor engage so as to provide a snap-fit connection between said rotor and said stator.

\* \* \* \* \*